US007459677B2

(12) United States Patent
Geist et al.

(10) Patent No.: US 7,459,677 B2
(45) Date of Patent: Dec. 2, 2008

(54) MASS SPECTROMETER FOR TRACE GAS LEAK DETECTION WITH SUPPRESSION OF UNDESIRED IONS

(75) Inventors: J. Daniel Geist, Boxborough, MA (US); Jeffrey Diep, Quincy, MA (US); Peter Williams, Phoenix, AZ (US); Charles W. Perkins, Boston, MA (US)

(73) Assignee: Varian, Inc., Palo Alto, CA (US)

( * ) Notice: Subject to any disclaimer, the term of this patent is extended or adjusted under 35 U.S.C. 154(b) by 228 days.

(21) Appl. No.: 11/354,410

(22) Filed: Feb. 15, 2006

(65) Prior Publication Data

US 2007/0187586 A1 Aug. 16, 2007

(51) Int. Cl.
*B01D 59/44* (2006.01)

(52) U.S. Cl. ....................... 250/288; 250/282; 250/299; 250/300

(58) Field of Classification Search .......... 250/281–300
See application file for complete search history.

(56) References Cited

U.S. PATENT DOCUMENTS

| | | | | |
|---|---|---|---|---|
| 3,277,295 | A | 10/1966 | Briggs | |
| 3,520,176 | A | 7/1970 | Becker | |
| 3,591,827 | A | 7/1971 | Hall | |
| 3,690,151 | A | 9/1972 | Briggs | |
| 4,499,752 | A | 2/1985 | Fruzzetti et al. | |
| 4,735,084 | A | 4/1988 | Fruzzetti | |
| 4,773,256 | A | 9/1988 | Saulgeot | |
| 4,845,360 | A | 7/1989 | Landfors | |
| 5,340,983 | A * | 8/1994 | Deinzer et al. | 250/281 |
| 5,451,781 | A * | 9/1995 | Dietrich et al. | 250/291 |
| 5,477,046 | A * | 12/1995 | Dietrich et al. | 250/288 |
| 5,506,412 | A | 4/1996 | Buttrill, Jr. | |
| 5,625,141 | A | 4/1997 | Mahoney et al. | |
| 5,661,229 | A | 8/1997 | Bohm et al. | |
| 5,728,929 | A | 3/1998 | Gevaud | |
| 6,014,892 | A | 1/2000 | Baret et al. | |
| 6,286,362 | B1 | 9/2001 | Coffman et al. | |
| 6,781,117 | B1 * | 8/2004 | Willoughby et al. | 250/281 |
| 2004/0238755 | A1 * | 12/2004 | Lee et al. | 250/423 R |

OTHER PUBLICATIONS

Article by Philip T. Smith entitled "The ionization of Helium, Neon, and Argon by Electron Impact", published by Physical Review, vol. 36, Oct. 15, 1930, pp.1293-1302.

* cited by examiner

*Primary Examiner*—Jack I Berman
*Assistant Examiner*—Andrew Smyth
(74) *Attorney, Agent, or Firm*—Bella Fishman; William R. McClellan

(57) ABSTRACT

Mass spectrometers for trace gas leak detection and methods for operating mass spectrometers are provided. The mass spectrometer includes an ion source to ionize trace gases, such as helium, a magnet to deflect the ions and a detector to detect the deflected ions. The ion source includes an electron source, such a filament. The method includes operating the electron source at an electron accelerating potential relative to an ionization chamber sufficient to ionize the trace gas but insufficient to form undesired ions, such as triply charged carbon.

8 Claims, 6 Drawing Sheets

MASS SPECTROMETER FOR TRACE GAS LEAK DETECTION WITH SUPPRESSION OF UNDESIRED IONS

CROSS-REFERENCE TO RELATED APPLICATION

This application is related to the following co-pending U.S. patent application entitled "HIGH SENSITIVITY SLIT-LESS ION SOURCE MASS SPECTROMETER FOR TRACE GAS LEAK DETECTION", which is commonly assigned to the assignee of the present disclosure and is being filed concurrently with the present application on Feb. 15, 2006.

FIELD OF THE INVENTION

This invention relates to mass spectrometers that are used for leak detection applications and, more particularly, to mass spectrometers wherein sensitivity is enhanced by suppressing the formation of undesired ions which can interfere with measurements.

BACKGROUND OF THE INVENTION

Helium mass spectrometer leak detection is a well-known leak detection technique. Helium is used as a tracer gas, which passes through the smallest of leaks in a sealed test piece. The helium is then drawn into a leak detection instrument and is measured. The quantity of helium corresponds to the leak rate. An important component of the instrument is a mass spectrometer, which detects and measures the helium. The input gas is ionized and mass analyzed by the spectrometer in order to separate the helium component, which then measured. In one approach, the interior of a test piece is coupled to the test port of the leak detector. Helium is sprayed onto the exterior of the test piece, is drawn inside through a leak and is measured by the leak detector.

Industries frequently require very low leak rates due to environmental regulations, desire for improved product yield, extension of technology into new fields, or various other reasons. The ion current in a helium mass spectrometer for very low leak rates is on the order of femtoamps. With prior art leak detector spectrometers, this exceedingly small signal is difficult to detect with sufficient stability to provide an unambiguous leak rate signal in a leak detector. The signal-to-noise ratio and the signal stability over time are therefore critical for high-sensitivity leak detection.

A mass spectrometer separates gas species by mass-to-charge ratio so the gases can be analyzed at a detector. By far, the most common tracer gas used in the leak detection industry is helium, which appears at mass 4 on the mass scale (helium of mass 4 with charge 1). For many years, an unknown source of background variation has hindered precise measurement of small helium leak detection signals.

Accordingly, there is a need for improved mass spectrometers and methods for trace gas leak detection.

SUMMARY OF THE INVENTION

According to a first aspect of the invention, a method is provided for operating a mass spectrometer including an ion source to ionize a trace gas, a magnet to deflect the ions and a detector to detect the deflected ions, the ion source including an electron source. The method comprises operating the electron source at an electron accelerating potential relative to an ionization chamber sufficient to ionize the trace gas but insufficient to form undesired ions.

According to a second aspect of the invention, a method is provided for operating a mass spectrometer including an ion source to ionize helium, a magnet to deflect the helium ions and a detector to detect the deflected helium ions, the ion source including a filament. The method comprises operating the filament at an electron accelerating potential relative to an ionization chamber sufficient to ionize the helium but insufficient to form triply charged carbon.

According to a third aspect of the invention, a mass spectrometer comprises an ion source including an electron source, a power supply to operate the electron source at a voltage relative to an ionization chamber sufficient to produce helium ions but insufficient to produce triply charged carbon, a magnet to deflect the helium ions, and a detector to detect the deflected helium ions.

BRIEF DESCRIPTION OF THE DRAWINGS

For a better understanding of the present invention, reference is made to the accompanying drawings, which are incorporated herein by reference and in which.

DETAILED DESCRIPTION OF THE INVENTION

Figure 1:
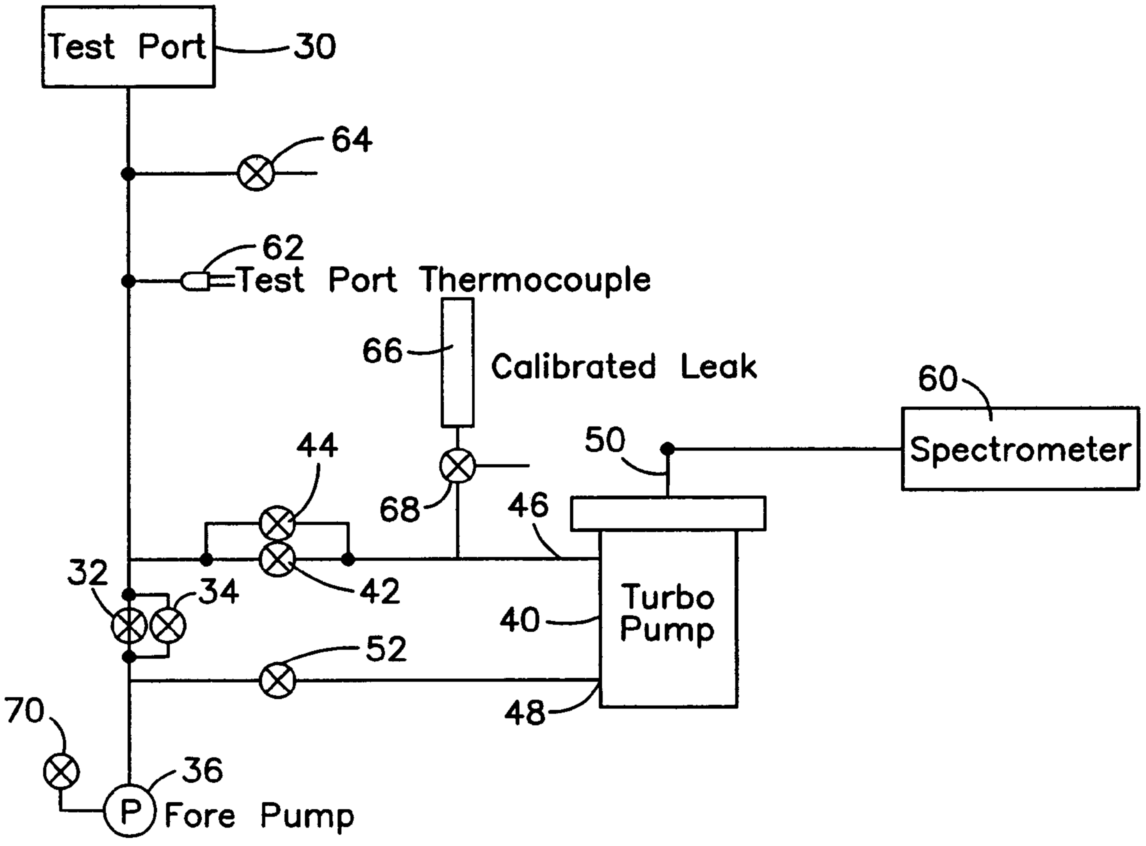
FIG. 1 is a schematic block diagram of a counterflow leak detector suitable for incorporation of the present invention.

A leak detector suitable for implementation of embodiments of the invention is illustrated schematically in FIG. 1. A test port 30 is coupled through contraflow valves 32 and 34 to a forepump 36. The leak detector also includes a high vacuum pump 40. The test port 30 is coupled through midstage valves 42 and 44 to a midstage port 46 on high vacuum pump 40 located between a foreline 48 and an inlet 50 of high vacuum pump 40. A foreline valve 52 couples forepump 36 to the foreline 48 of high vacuum pump 40. The inlet 50 of high vacuum pump 40 is coupled to the inlet of a mass spectrometer 60. The leak detector further includes a test port thermocouple 62 and a vent valve 64, both coupled to test port 30, a calibrated leak 66 coupled through a calibrated leak valve 68 to midstage port 46 of high vacuum pump 40 and a ballast valve 70 coupled to forepump 36.

In operation, forepump 36 initially evacuates test port 30 and the test piece (or sniffer probe) by closing foreline valve 52 and vent valve 64 and opening contraflow valves 32 and 34. When the pressure at the test port 30 reaches a level compatible with the foreline pressure of high vacuum pump 40, foreline valve 52 is opened, exposing test port 30 to the foreline 48 of high vacuum pump 40. The helium tracer gas is drawn through test port 30 and diffuses in reverse direction through high vacuum pump 40 to mass spectrometer 60. Forepump 36 continues to lower the pressure in test port 30 to the point where the pressure is compatible with the midstage pressure in high vacuum pump 40. At that point, contraflow valves 32 and 34 are closed and midstage valves 42 and 44 are opened, exposing test port 30 to the midstage port 46 of high vacuum pump 40. The helium tracer gas is drawn through test port 30 and diffuses in reverse direction through the upper portion of high vacuum pump 40 to mass spectrometer 60, allowing more gas to diffuse because of the shorter reverse direction path. Since high vacuum pump 40 has a much lower reverse diffusion rate for heavier gases in the sample, it blocks these gases from mass spectrometer 60, thereby efficiently separating the tracer gas, which diffuses through high vacuum pump 40 to mass spectrometer 60 and is measured.

As indicated above, an unknown source of background variation has, for many years, hindered precise measurement of small helium leak detector signals. That background signal has now been identified as triply charged carbon ($C^{3+}$), which also appears at mass/charge 4 (carbon mass 12 with charge 3) in the spectrometer output. The present invention solves that problem. The residual gas inside the vacuum system typically contains hydrocarbon species and CO; these species can be dissociated and ionized to produce $C^{3+}$ directly. In addition, the residual gas species adsorb onto surfaces in the ion source where they can be impacted by the ionizing electron beam and chemically cracked to produce a solid carbonaceous deposit, visible as "burn marks" inside the source after extended operation. Subsequent electron impact on these carbonaceous deposits can release volatile carbon-containing species back into the gas phase to be ionized by the electron beam, so that these deposits constitute a virtually infinite source of $C^{3+}$ ions. Due to the complex process for forming triply charged carbon in a mass spectrometer, the amount of $C^{3+}$ background can vary randomly over time, resulting in an apparent drift of the leak detector calibration or an erratic leak rate signal. It is impossible in an operating spectrometer to identify what part of the mass/charge 4 signal is from the actual helium tracer gas and what part is from $C^{3+}$ background, because the fractional mass difference between $He^{+}$ (singly charged helium) and $C^{3+}$ is very small and cannot be resolved in a leak detector mass spectrometer that sacrifices mass resolving power in order to operate with relatively large slits and very high ion transmission.

The mass spectrometer structure described herein, together with specialized operating voltages, permit high helium sensitivity without interference from $C^{3+}$ ions. The mass spectrometer geometry provides a high helium signal while operation at specialized voltages excludes $C^{3+}$ ions from the system. The helium signal can then be read directly without concern for erratic or incorrect measurements due to $C^{3+}$ background.

The probability of creating $C^{3+}$ ions is a function of the kinetic energy of electrons entering the ion source chamber from the filament or other electron source. The voltage differential between the filament and the ion source chamber largely determines that electron kinetic energy. As described below, the filament or other electron source is operated at a voltage differential sufficient to ionize the trace gas, such as helium, but insufficient to form undesired ions, such as triply charged carbon. Thus, undesired ions do not interfere with the measurements.

A mass spectrometer 100 in accordance with an embodiment of the invention is shown in FIGS. 2-5. Mass spectrometer 100 corresponds to mass spectrometer 60 in FIG. 1. Mass spectrometer 100 includes a main magnet 110, typically a dipole magnet, an ion source 120 and an ion detector 130. Main magnet 110 includes spaced-apart polepieces 112 and 114 (FIG. 3), which define a gap 116. Ion source 120 is located outside gap 116 and thus is not located between polepieces 112 and 114. Ion detector 130 is positioned in gap 116 between polepieces 112 and 114 to intercept a selected species of the ions generated by ion source 120. Ions generated by ion source 120 enter gap 116 between polepieces 112 and 114 of main magnet 110 and are deflected by the magnetic field in gap 116. The deflection is a function of the mass-to-charge ratio of the ions, the ion energy and the magnetic field. Ions of the selected species, such as helium ions, follow an ion trajectory 132, while other ion species follow different trajectories. The ion detector 130 is located in gap 116 between polepieces 112 and 114 and is positioned at a natural focus of the selected ion species.

Mass spectrometer 100 may further include a collimator 134 having a slit 136 and ion optical lens 138. Collimator 134 permits ions following ion trajectory 132 to pass through slit 136 to ion detector 130 and blocks ions following other trajectories. Ion optical lens 138 is operated at a high positive potential near the ion source potential and acts to block scattered ions of species other than helium from reaching the ion detector. This action results from the fact that non-helium ions that have undergone scattering collisions, with neutral gas atoms or with the chamber walls, that change their trajectories sufficiently for them to reach slit 136, lose energy in those collisions and so are unable to overcome the potential energy barrier imposed by ion optical lens 138. Ion optical lens 138 also acts to focus ions following ion trajectory 132 onto ion detector 130.

A vacuum housing 140 encloses a vacuum chamber 142, including a portion of ion source 120 and gap 116 between polepieces 112 and 114 of main magnet 110. A vacuum pump 144 has an inlet connected to vacuum housing 140. Vacuum pump 144 maintains vacuum chamber 142 at a suitable pressure, typically on the order of $10^{-5}$ torr, for operation of mass spectrometer 100. Vacuum pump 144 is typically a turbomolecular vacuum pump, a diffusion pump or other molecular pump and corresponds to high vacuum pump 40 shown in FIG. 1. As known in the leak detector art, the trace gas, such as helium, diffuses in a reverse direction through all or a portion of the vacuum pump 144 to mass spectrometer 100 and is measured. This configuration is known as a contraflow leak detector configuration. In the contraflow configuration, heavier gases are pumped from vacuum chamber 142, while lighter gases diffuse in reverse direction through vacuum pump 144 to mass spectrometer 100. It will be understood that the present invention is not limited to use in contraflow leak detectors.

Ions following trajectory 132 are detected by ion detector 130 and converted to an electrical signal. The electrical signal is provided to detector electronics 150. Detector electronics 150 amplifies the ion detector signal and provides an output that is representative of leak rate.

Figure 3:
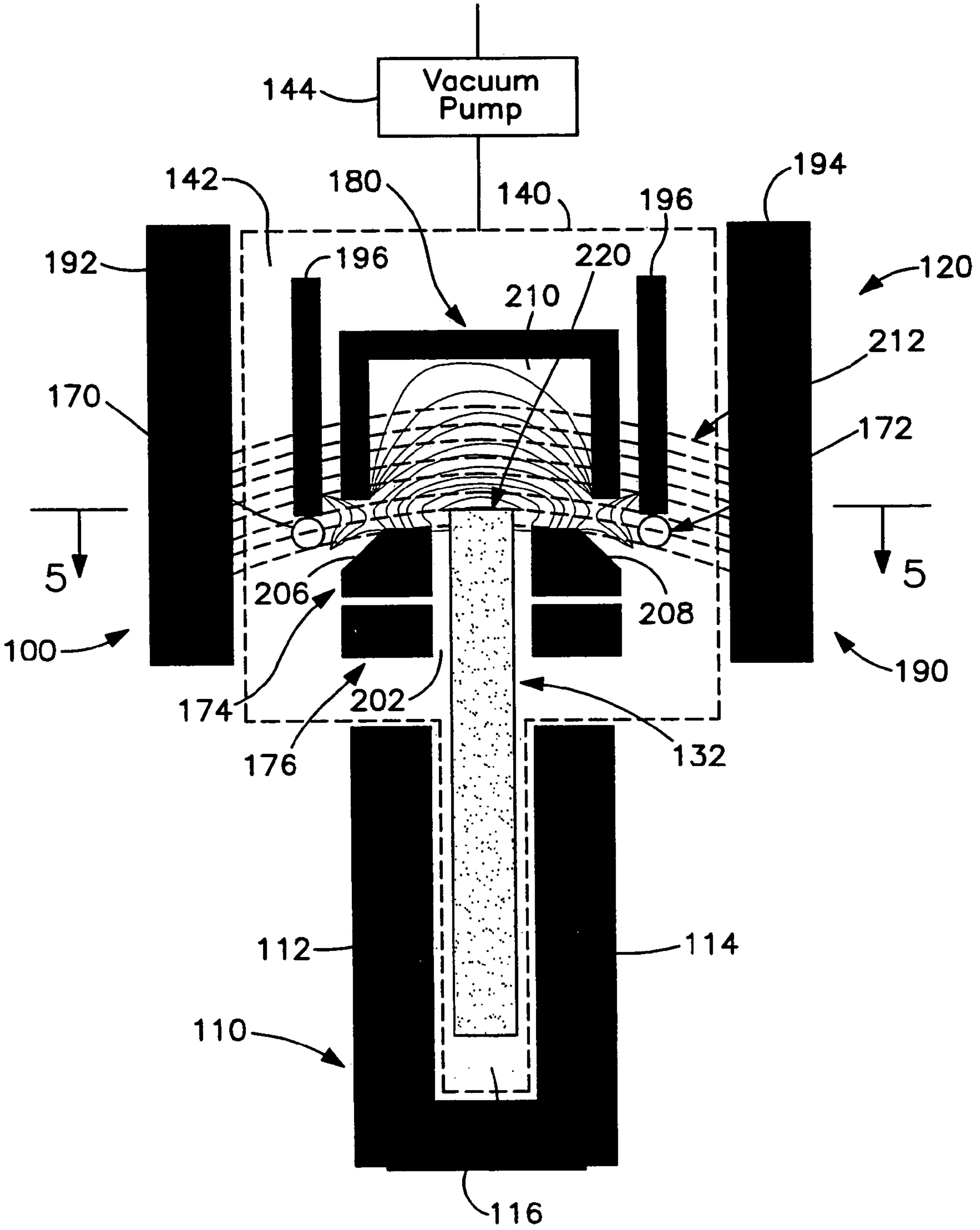
FIG. 3 is simplified schematic end view of the mass spectrometer of FIG. 2.

As best shown in FIG. 3, ion source 120 includes filaments 170 and 172, an extractor electrode 174, a reference electrode 176 and a repeller electrode 180, all located within vacuum housing 140. Ion source 120 further includes a source magnet 190 located outside vacuum housing 140. Source magnet 190 includes spaced-apart polepieces 192 and 194 located on opposite sides of vacuum chamber 142. It will be understood that the magnetic field provided by the source magnet can alternatively be provided by the fringe field extending from the main magnet 110.

Filaments 170 and 172 may each be in the form of a helical coil and may be supported by a filament holder 196. In one embodiment, each of filaments 170 and 172 is fabricated of 0.006 inch diameter iridium wire coated with thorium oxide. Each filament coil may be 3 millimeters long and 0.25 millimeter in diameter. Preferably, one filament at a time is energized for extended ion source life.

Figure 4:
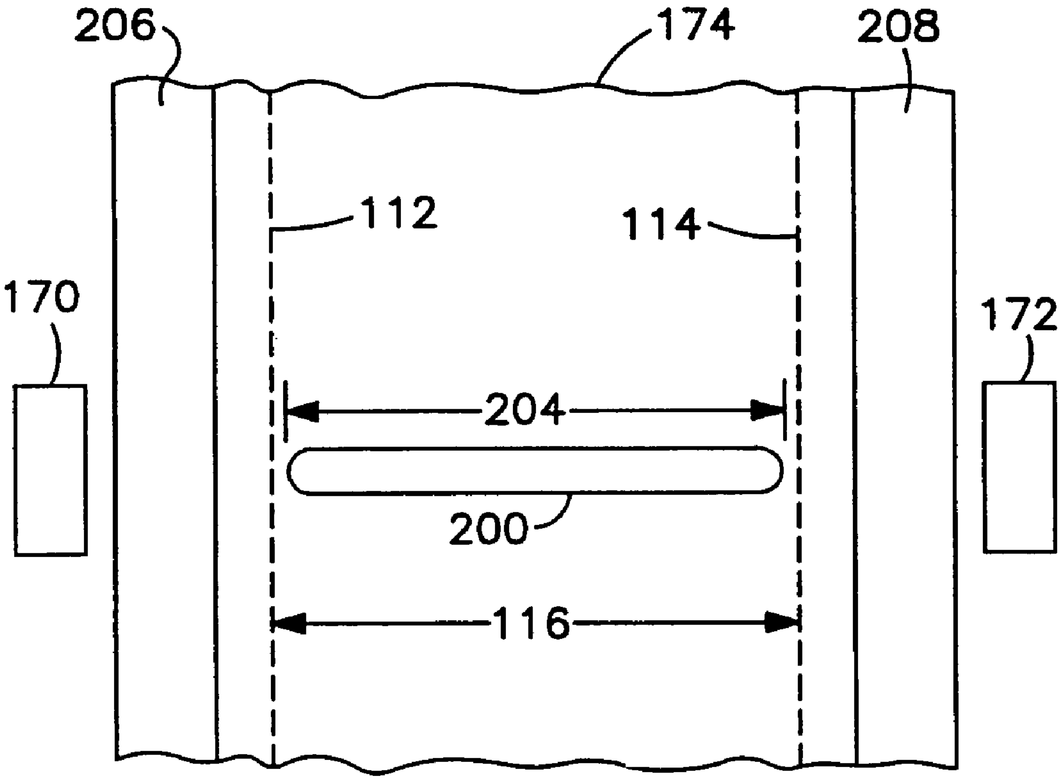
FIG. 4 is a partial cross-sectional view of the ion source, taken along the line 4-4 of FIG. 3.

Extractor electrode 174 may be provided with an elongated extractor slit 200, and reference electrode 176 may be provided with an elongated reference slit 202. Elongated slits 200 and 202, which serve as ion-optical lenses, are aligned and provide a path for extraction of ions from ion source 120 along ion trajectory 132. In FIG. 4, the inside surfaces of polepieces 112 and 114 of main magnet 110 are shown. As further shown, a long dimension of extractor slit 200 is perpendicular to the inside surfaces of polepieces 112 and 114. The length 204 of extractor slit 200 is sufficient that the width of the ion beam fills the gap 116 between polepieces 112 and 114, where the width of gap 116 is defined as the spacing in the vacuum chamber 142 between polepieces 112 and 114. The accelerating electric field between the extractor slit 200 and the reference slit 202 penetrates through the extractor slit and shapes the electric field in the cup-shaped recess 210 to provide efficient extraction and focusing of the helium ions formed just above the extractor slit. The extractor slit length may be relatively large in comparison with prior art mass spectrometers because the ion source is located outside of the main magnet. In one embodiment, the length 204 of extractor slit 200 is 8 millimeters, the width of extractor slit 200 is 3 millimeters, and gap 116 has a dimension of 10 millimeters. The dimensions of the reference slit 202 are also chosen to ensure that the beam width fills the gap. These configurations ensure a relatively high ion current of the desired trace gas species.

A potential source of signal loss is the divergence of the ion beam in the direction of the extractor slit length, due to the overall focusing/defocusing effect of the penetrating field near the ends of the extractor slit 200 and the reference slit 202. In some embodiments, because of the external ion source, the extractor slit length can be made equal to or greater than the width of gap 116. Then, the ions that are transmitted are those formed in the central portion of the extractor slit and these ions are transmitted more or less straight through to the detector. There is also some divergence due to the accelerating field penetrating through the reference slit, but this slit can also be made equal to or longer than the width of gap 116 so that the ions in the central portion are not substantially diverging. In order to increase the lengths of the extractor slit and/or the reference slit, it may be necessary or desirable to increase the overall size of the ion source.

As further shown in FIGS. 3 and 4, extractor electrode 174 is provided with chamfered edges 206 and 208 adjacent to filaments 170 and 172, respectively. Chamfered edges 266 and 208 shape the electric field in the vicinity of filaments 170 and 172 to enhance transport of electrons into the ionization region.

As shown in FIG. 3, reference electrode 176 is positioned between extractor electrode 174 and main magnet 110. Repeller electrode 180 is located above and is spaced from extractor electrode 174. Repeller electrode 180 includes a cup-shaped recess 210 that provides a desired electric field distribution. Alternatively, repeller electrode 180 may be held at the same electrical potential as extractor electrode 174 and may contact extractor electrode 174 or be fabricated together with extractor electrode 174 as a single unit.

Polepieces 192 and 194 of source magnet 190 may have generally parallel, spaced-apart surfaces facing vacuum chamber 142 and produce magnetic field 212 in a region of filaments 170 and 172, extractor electrode 174 and repeller electrode 180. As shown in FIG. 3, magnetic field 212 is deformed upwardly by the fringe magnetic field of main magnet 110. The resulting magnetic field distribution causes electrons emitted by filaments 170 and 172 to spiral around the direction of the magnetic field lines to an ionization region 220. Ionization region 220 is located above extractor slit 200 (FIG. 3). The electric fields and the magnetic fields in the region between filaments 170, 172 and ionization region 220 cause ionizing electrons to be accelerated toward ionization region 220. In ionization region 220, gas molecules are ionized by electrons from filaments 170, 172, are extracted from ion source 120 through extractor slit 200 and are accelerated through reference slit 202.

Figure 2:
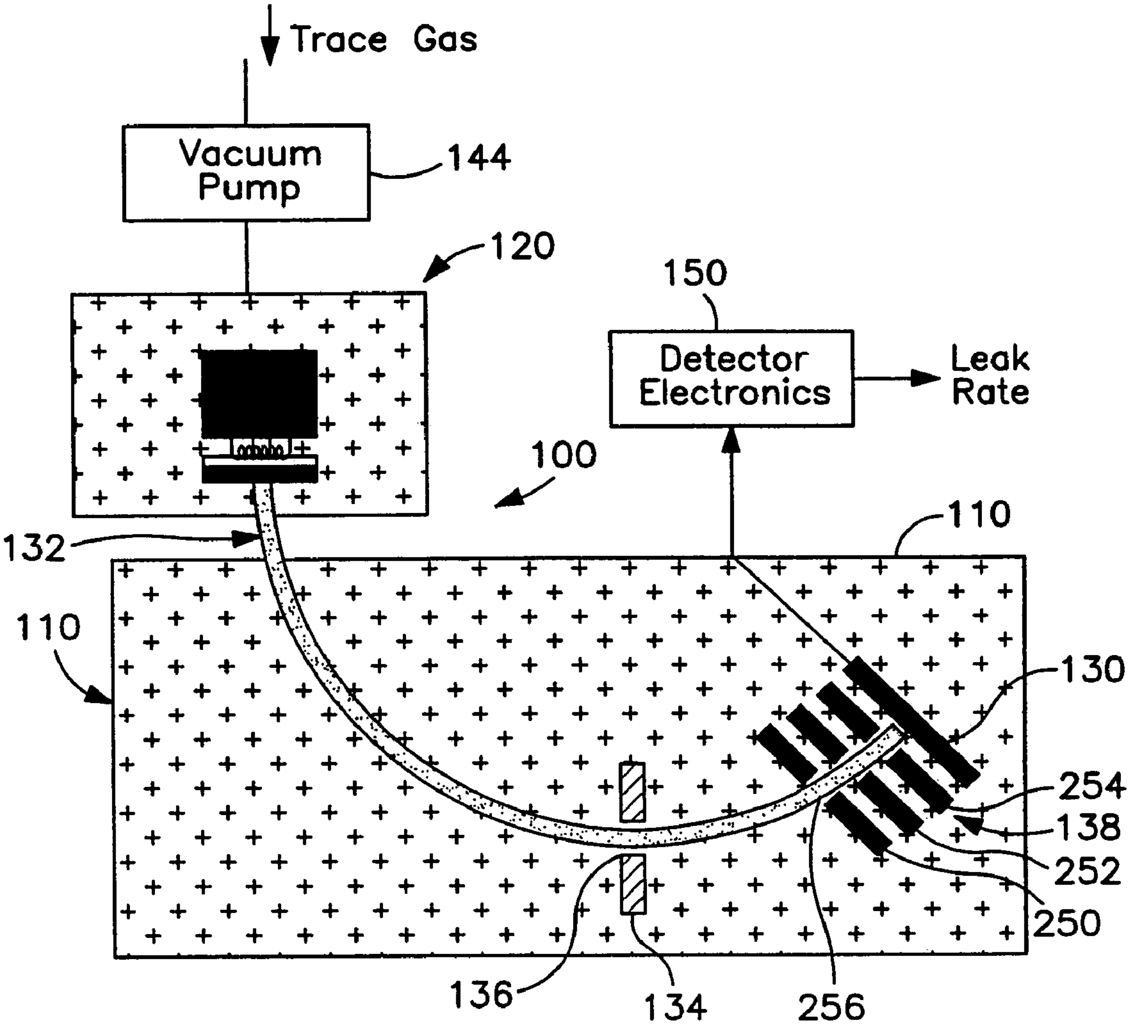
FIG. 2 is a simplified schematic side view of a mass spectrometer in accordance with an embodiment of the invention.

The ion source 120 is located outside of the main magnet 110, so that the length 204 of extractor slit 200 is not limited by polepieces 112 and 114 of main magnet 110. The dimensions of extractor slit 200 can be selected to transmit a high ion current. The beam optics yields a focal point after deflection through an angle of 135° following passage through the reference slit 202, as shown in FIG. 2. Mass spectrometer 100 includes main magnet 100 which separates the ions according to mass-to-charge ratio and source magnet 190 which includes polepieces 192 and 194 on opposite sides of filaments 170 and 172 in ion source 120. The two magnets are sufficiently close that they affect each other, both in strength and in field shape, as shown in FIG. 3. In one embodiment, main magnet 110 has a field strength of 1.7 K Gauss at the pole center and source magnet 190 has a field strength of 600 Gauss at the pole center.

The magnetic fields and the electric fields of the ion source 120 are designed so that the lines of magnetic flux are approximately coincident with and parallel to the surfaces of constant electrical potential (electrical equipotential surfaces), at least in ionization region 220. Because the ionizing electron beam generated by filaments 170 and 172 is constrained to follow the magnetic field lines, the ions are thus created in a volume of roughly constant electric potential. As a result, the ion beam has a very small energy spread and is very efficiently transported from the ion source 120 to the ion detector 130, thereby providing high sensitivity.

The positions of magnets 110 and 190 relative to ion source 120, ion detector 130 and each other are selected for efficient formation and transmission of ions. The main magnet 110 and the source magnet 190 are in close proximity to each other. A fringe field extending beyond the gap 116 of the main magnet 110 deforms the otherwise uniform magnetic field of the source magnet 190.

The lines of electrical equipotential surfaces are defined by the shape and spacing of the elements in the ion source 120, including the repeller electrode 180, the extractor electrode 174, the reference electrode 176 and the openings (slits) in these electrodes, and the adjacent vacuum chamber walls. The dimensions and spacings of these elements are controlled to form a "cup-open-down" electric field shape that focuses ions generated in the source toward the extractor slit 200 for more efficient extraction.

The relatively thick wall of repeller electrode 180 and extractor electrode 174 form a channel slightly wider than the filament diameter through which electrons can flow without loss, while electric field penetration from the negatively-charged filaments is limited. This limits leakage of ions from ionization region 220 to filaments 170 and 172 in the negative potential of the electron cloud, ensuring that a high percentage of ions created in the source are in fact transmitted from the source to the ion detector 130 for high sensitivity.

The ion source elements are designed such that the electric fields of the extractor electrode 174, the repeller electrode 180 and the reference electrode 176 produce electric fields that form a "virtual" ion optical object line rather than a physical entrance slit. The physical entrance slit and the unavoidable beam losses of the physical slit are eliminated so that ion beam transmission is very high. The slit in the reference electrode 176 acts only to limit the angular divergence of the ion beam, and not as an entrance slit and ion optical object.

Elimination of the physical entrance slit allows miniaturization of the mass spectrometer with minimal loss of either sensitivity or resolution. The resolving power of the mass spectrometer can be defined as the ratio of the ion beam radius, R, to the sum of the image width and the exit slit width, $S_{EX}$. For a conventional mass spectrometer design with a physical entrance slit of width $S_E$ forming the ion optical object of the system, the image width is ($S_E$+R$\alpha^2$). The exit slit width is set to be equal to or slightly larger than the image width in order to transmit all the arriving ions, so that the resolving power, RP, is thus:

$$RP=R/2(S_E+R\alpha^2)$$

Because the ion optical object in the present invention is a line of negligible width, rather than a slit illuminated by a broad ion beam, the image width at the ion focal point is R$\alpha^2$ rather than ($S_E$+R$\alpha^2$). Thus, the resolving power is:

$$RP=R/(2R\alpha^2)=1/(2\alpha^2)$$

Therefore, the resolving power is independent of the radius of the ion beam trajectory, so long as the width of the ion optical object can be ignored. With this design, if it is desired to reduce the ion beam radius R in order to achieve a compact device, the resolving power remains constant, so long as the ion beam divergence, $\alpha$, remains constant. The image width is reduced proportionately to the ion beam radius, and the exit slit width can be reduced by a comparable amount to match image width and maintain a constant mass-resolving power while transmitting all the ions exiting the ion source. By contrast, in a conventional mass-spectrometer, to maintain constant mass-resolving power while reducing the radius, the entrance slit width must be reduced proportionately, thereby reducing the fraction of ions transmitted through the slit and reducing the sensitivity of the device.

Figure 5:
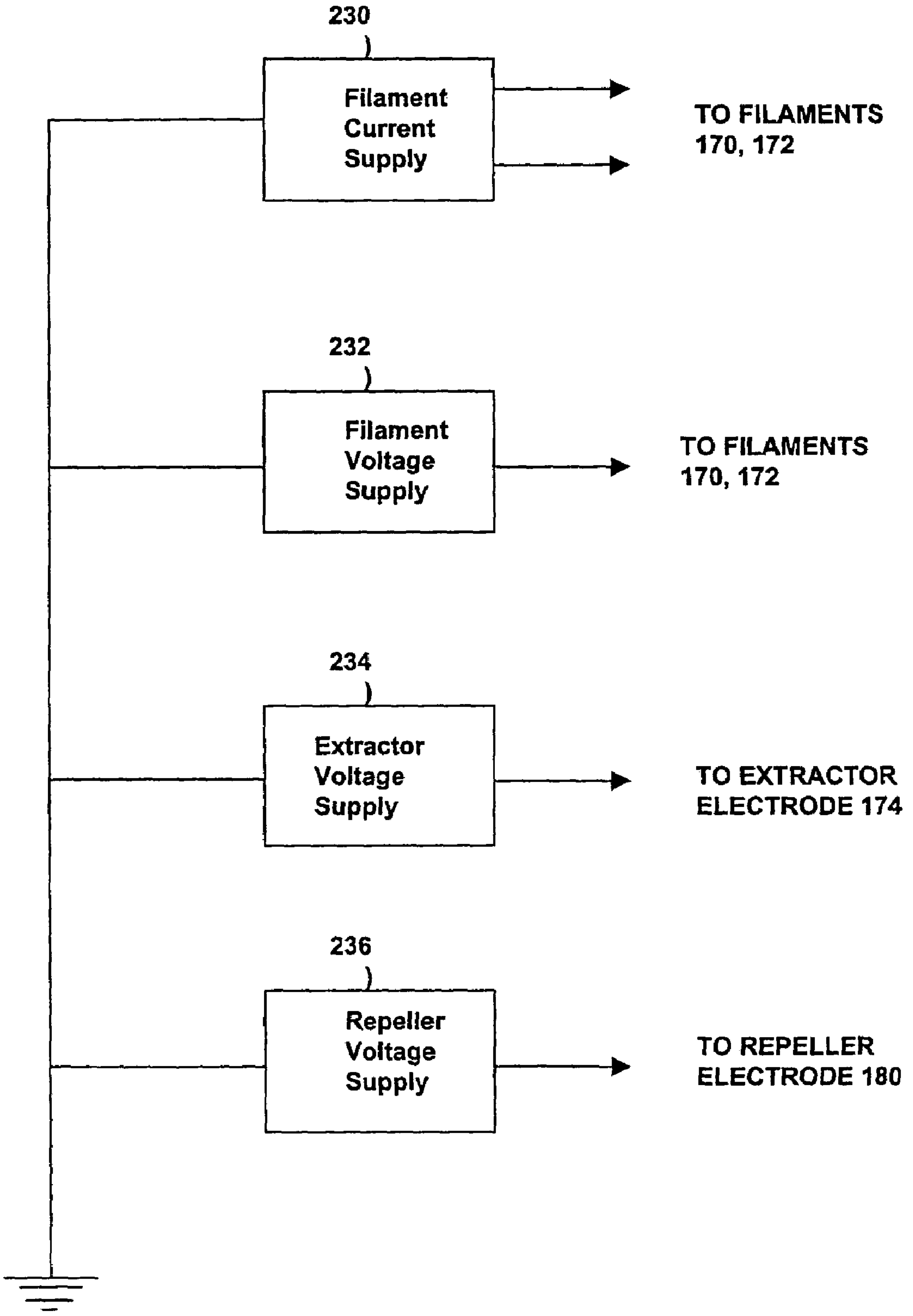
FIG. 5 is a block diagram showing power supplies for the mass spectrometer of FIG. 2.

The mass spectrometer may include power supplies as shown in FIG. 5. A filament current supply 230 supplies filament current to filaments 170 and 172 for heating thereof. As noted above, one filament at a time may be energized. A filament voltage supply 232 supplies a bias voltage to filaments 170 and 172. An extractor voltage supply 234 supplies a bias voltage to extractor electrode 174. A repeller voltage supply 236 supplies a bias voltage to repeller electrode 180. Reference electrode 126 is typically grounded.

Voltages are applied to filaments 170 and 172, repeller electrode 180, extractor electrode 174 and reference electrode 176 to provide electric fields for operation as described above. In one embodiment where helium is the tracer gas, repeller electrode 180 is biased at 200 to 280 volts, extractor electrode 174 is biased at 200 to 280 volts and reference electrode 176 is grounded (0 volts). In addition, filaments 170 and 172 are biased at 100 to 210 volts to provide energetic electrons for ionization of the trace gas. In one specific example, repeller electrode 180 and extractor electrode 174 are nominally biased at 250 volts, filaments 170 and 172 are nominally biased at 160 volts and reference electrode 176 is grounded. The above voltages are specified with respect to ground. It will be understood that these values are given by way of example only and are not limiting as to the scope of the invention.

As shown in FIG. 2, ion optical lens 138 may include electrodes 250, 252 and 254, each having an aperture 256 to permit passage of ions to ion detector 130. Electrodes 250, 252 and 254 constitute an Einzel lens that focuses ions toward ion detector 130 and the electrical potential applied to electrode 252 acts to suppress ions of species other than helium that are scattered into trajectories that could otherwise allow them to reach the detector. In one embodiment, electrodes 250, 252 and 254 are biased at 0 volts, 180 volts and 0 volts, respectively.

In one embodiment, a detector assembly, including ion detector 130 and detector electronics 150, can be designed for high sensitivity measurement of ion currents over a wide range and with high signal-to-noise ratio. The ion detector 130 may be a Faraday plate that is connected to the inverting input of an electrometer grade operational amplifier. Ions that follow ion trajectory 132 through lens 138 strike the Faraday plate and generate a very small current in the plate. The amplifier is configured as an inverting transconductance amplifier with a bandwidth-limiting capacitor. The feedback resistor can be in a range selected to provide a gain of between $1\times10^9$ and $1\times10^{13}$. The capacitor is selected to allow the specified transient response of the detector, but to reject noise with a frequency higher than the desired transient response. To further reduce the 1/f noise, the amplifier is cooled by a Peltier or Thermo-Electric cooler. The cooler is a two-stage type with a maximum delta-T of 94 degrees C. The cold side of the cooler is bonded to the electrometer amplifier and the hot side is bonded to a detector structural post. The very low temperature of the electrometer amplifier in this thermal configuration lowers the input bias and offset currents and thus the 1/f noise components to their lowest achievable levels for this device when the spectrometer body is at its highest operating temperature. This guarantees the lowest possible noise from the detector under the worst-case ambient thermal conditions.

Various values of parameters, including but not limited to pressure levels, materials, dimensions, voltages and field strengths, are given above in describing embodiments of the invention. It will be understood that these values are given by way of example only and are not limiting.

Figure 6:
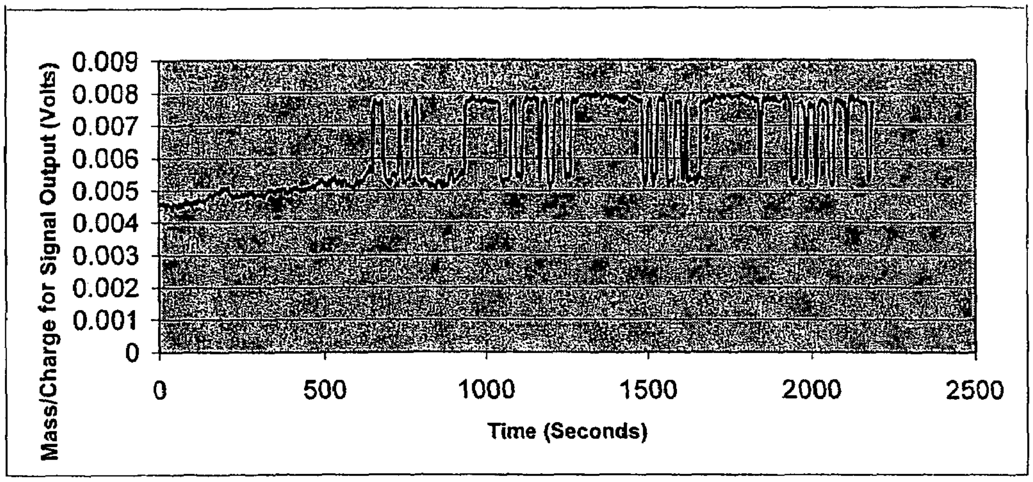
FIG. 6 is a graph of detector signal output as a function of a time showing an erratic $C^{3+}$ background signal in the absence of helium.

FIG. 6 shows a of graph detector output signal at mass/charge 4 as a function of time in the absence of helium. The erratic signal is due to interference from $C^{3+}$ ions.

Figure 7:
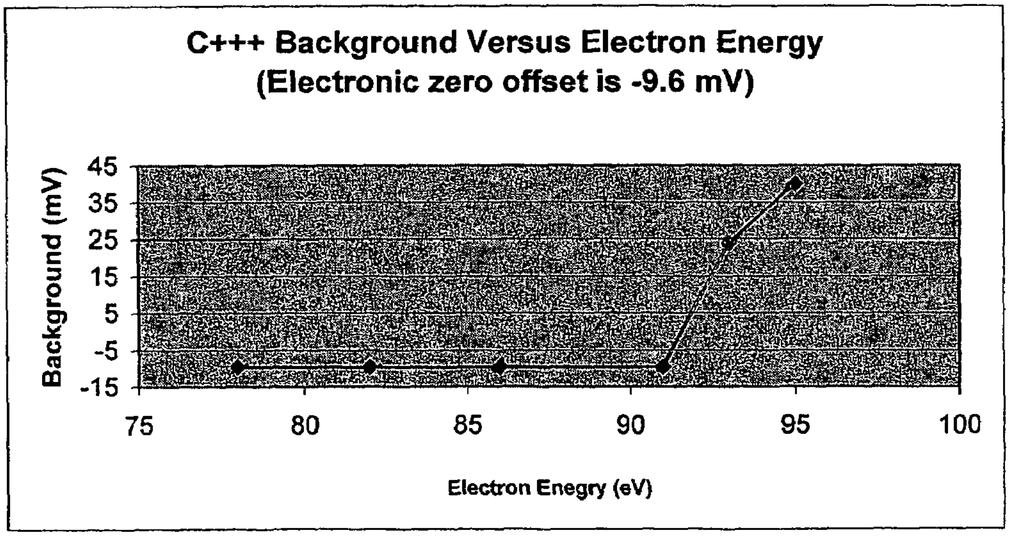
FIG. 7 is a graph of detector signal as function of electron kinetic energy in the ion source.

FIG. 7 shows a graph of spectrometer signal as a function of electron kinetic energy in a leak detector system demonstrated to be leak free and purged from the inlet with 99.99999% pure argon to insure no helium back flow from the atmosphere through the vacuum pumps. As the electron kinetic energy reaches approximately 92 eV (electron volts), the baseline mass/charge 4 signal begins to grow erratically despite the absence of helium. This is the point of onset for $C^{3+}$ ion formation in the spectrometer ion source as observed at the spectrometer detector.

Operating the ion source below the $C^{3+}$ ionization threshold permits very sensitive and very stable measurement of helium leak rates. This has not been possible in prior art devices due to space charge limitations in the ion source and spectrometer inefficiency. Space charge due to low energy electrons just outside the filament surface limits the maximum electron current that can be drawn out of a filament. Space charge due to the electron beam within the ion chamber can trap $He^+$ ions after formation and so reduce the efficiency with which they can be extracted and transported to the detector; this limits the maximum electron current that can be used to create ions. Prior art spectrometers for leak detection operate at high filament voltages, typically 100 volts or more, to insure that a sufficient number of electrons reach the ion chamber to yield a sufficient quantity of helium ions to permit measurement of small leak rates of, for example, 1E-10 or less. In prior art leak detectors, operation at low filament bias voltage would not permit sufficient ionization of helium to make a practical, high-sensitivity leak detector spectrometer.

The ion source geometry described herein, combined with the discovery regarding $C^{3+}$ ions, permits operation of the spectrometer with a differential of 25 to 92 volts between the ionization chamber and the filament, below the carbon ionization threshold, but above the ionization threshold for helium, so that high sensitivity is achieved with stable and accurate leak rate measurements. The ionization chamber in the embodiment of FIGS. 2-5 is defined by repeller electrode 180 and extractor electrode 174.

In summary, the ion source of the mass spectrometer is operated such that the ionizing electrons have energies sufficient to ionize the trace gas, typically helium, but insufficient to form undesired ions, in this case $C^{3+}$ ions. In the example described herein, the filament in the ion source is biased at an electron accelerating potential relative to the ionization chamber in a range of −25 to −92 volts, so as to provide ionizing electrons with energies less than the ionization energy for formation of $C^{3+}$ ions but sufficient to form $He^{+}$ ions. The electron accelerating potential is defined by the potential difference between filaments 170, 172 and the ionization chamber. In order to establish an electron accelerating potential, filaments 170, 172 are biased negatively with respect to repeller electrode 180 and extractor electrode 174.

It will be understood that embodiments of the invention can be utilized in different leak detector architectures and in different mass spectrometer configurations to achieve high sensitivity with stable and accurate leak rate measurements. Thus, the invention is not limited to the leak detector architecture of FIG. 1 or to the mass spectrometer configuration of FIGS. 2-5. However, a preferred embodiment is to combine the present invention with the high-sensitivity mass spectrometer of FIGS. 2-5 in order to achieve the highest possible He+signal from the limited ionization efficiency that results from the space charge limit on the ionizing electron current and the reduced ionization efficiency that results from a lower electron kinetic energy.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of operating a mass spectrometer, including an ion source to ionize helium, a magnet to deflect the helium ions and a detector to detect the deflected helium ions, the ion source including a filament, the method comprising:

operating the filament at an electron accelerating potential relative to an ionization chamber sufficient to ionize the helium but insufficient to form triply charged carbon, comprising operating the filament to generate electrons having kinetic energies of 25 to 92 electron volts within the ionization chamber.

2. A method as defined in claim 1, comprising electrically biasing the filament at a voltage in a range of −25 to −92 volts relative to the ionization chamber.

3. A method as defined in claim 1, comprising operating the filament to generate electrons having energies within the ionization chamber less than the ionization energy of triply charged carbon.

4. A method as defined in claim 1, further comprising extracting the helium ions from the ion source, deflecting the extracted helium ions in a magnetic field, and detecting the deflected helium ions.

5. A mass spectrometer comprising:

an ion source including an electron source;

a power supply to operate the electron source at a voltage relative to an ionization chamber sufficient to produce helium ions but insufficient to produce triply charged carbon, wherein the power supply is configured to operate the electron source to produce electrons having kinetic energies within the ionization chamber of 25 to 92 electron volts;

a magnet to deflect the helium ions; and a detector to detect the deflected helium ions.

6. A mass spectrometer as defined in claim 5, wherein the power supply is configured to operate the electron source at a voltage in a range of −25 to −92 volts relative to the ionization chamber.

7. A mass spectrometer as defined in claim 5, wherein the power supply is configured to operate the electron source to produce electrons having energies within the ionization chamber less than the ionization energy of triply charged carbon.

8. A mass spectrometer as defined in claim 5, wherein the electron source comprises at least one filament and the power supply supplies a voltage to the filament.

* * * * *